United States Patent
Puri et al.

(10) Patent No.: US 9,349,038 B2
(45) Date of Patent: May 24, 2016

(54) METHOD AND APPARATUS FOR ESTIMATING POSITION OF HEAD, COMPUTER READABLE STORAGE MEDIUM THEREOF

(71) Applicant: SAMSUNG ELECTRONICS CO., LTD., Suwon-si (KR)

(72) Inventors: Anant Vidur Puri, Chandigarh (IN); Abhinav Parihar, Rajasthan (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 209 days.

(21) Appl. No.: 13/888,612

(22) Filed: May 7, 2013

(65) Prior Publication Data
US 2014/0072234 A1 Mar. 13, 2014

(30) Foreign Application Priority Data
Sep. 11, 2012 (KR) .......................... 10-2012-0100431

(51) Int. Cl.
*G06K 9/00* (2006.01)
*G06T 7/00* (2006.01)

(52) U.S. Cl.
CPC ........ *G06K 9/00335* (2013.01); *G06K 9/00221* (2013.01); *G06T 7/0048* (2013.01); *G06T 2207/10016* (2013.01); *G06T 2207/10024* (2013.01); *G06T 2207/20076* (2013.01); *G06T 2207/20081* (2013.01); *G06T 2207/30196* (2013.01)

(58) Field of Classification Search
USPC .................................................. 382/201, 103
See application file for complete search history.

(56) References Cited

U.S. PATENT DOCUMENTS

| | | | |
|---|---|---|---|
| 6,671,391 B1 * | 12/2003 | Zhang et al. .................. | 382/118 |
| 6,965,693 B1 * | 11/2005 | Kondo et al. .................. | 382/190 |
| 7,142,697 B2 * | 11/2006 | Huang et al. .................. | 382/118 |
| 7,620,204 B2 * | 11/2009 | Porikli et al. .................. | 382/103 |
| 8,401,239 B2 * | 3/2013 | Porikli et al. .................. | 382/107 |
| 8,401,251 B2 * | 3/2013 | Sasahara et al. ............. | 382/118 |
| 2007/0292019 A1 | 12/2007 | Terakawa | |
| 2011/0052013 A1 | 3/2011 | Sasahara et al. | |

FOREIGN PATENT DOCUMENTS

| | | |
|---|---|---|
| JP | 8-106519 | 4/1996 |
| JP | 2000-268180 | 9/2000 |
| JP | 2003-141551 | 5/2003 |
| JP | 2004-94491 | 3/2004 |
| JP | 2008-27273 | 2/2008 |
| KR | 10-0292810 | 6/2001 |
| KR | 10-0730500 | 6/2007 |
| KR | 10-2011-0007418 | 1/2011 |

* cited by examiner

*Primary Examiner* — Ishrat I Sherali
(74) *Attorney, Agent, or Firm* — NSIP Law

(57) ABSTRACT

A computer implemented method and an apparatus for estimating head position of an individual are described. The method includes cropping an image object in an image. The image object may include a visual representation of a head of at least one individual. The method further includes abstracting one or more features from the image object. Subsequently, position of the head of the at least one individual in the image object is determined using the one or more features and a predefined statistical model. The predefined statistical model may include a value of each of the pixels of one or more stored images representing variety of head poses and ranges of head poses of the at least one individual.

22 Claims, 6 Drawing Sheets

FIG. 4
| Test Image 402 | Abstracted Image 404 | Pose Range 406 | Test Image 402 | Abstracted Image 404 | Pose Range 406 |
|---|---|---|---|---|---|
|  |  | PL 60<br>PL 45 |  |  | PL 30<br>PL 45 |
|  |  | PR 60<br>PR 45 |  |  | PR 30<br>PR 45 |
|  |  | PL 60<br>PL 45 |  |  | PL 30<br>PL 15 |
|  |  | PR 30<br>PR 45 |  |  | PR 60<br>PR 45 |
|  |  | PL 60<br>PL 45 |  |  | PL 30<br>PL 45 |
400

METHOD AND APPARATUS FOR ESTIMATING POSITION OF HEAD, COMPUTER READABLE STORAGE MEDIUM THEREOF

CROSS-REFERENCE TO RELATED APPLICATIONS

This application claims the benefit of Korean Patent Application No. 10-2012-0100431, filed on Sep. 11, 2012, in the Korean Intellectual Property Office, the disclosure of which is incorporated herein by reference.

BACKGROUND

1. Field

One or more example embodiments of the following description relate to multimedia processing. More particularly, one or more example embodiments of the following description relate to estimating position of a head of an individual in an image.

2. Description of the Related Art

Computationally deriving a position of the head of a subject (a person or an individual) is one of the greatest challenges in the domain of Human Computer Interaction (HCI). Movement of the head is confined to various types, which include pitch, roll and yaw. Human beings tend to make such head movements with varying frequency. One of the requirements in research areas such as HCI is to estimate head poses dynamically or statically. The application areas of HCI include customer feedback, biological pose correction, gaze interfaces and so on. Some of the inferences that can be derived from the head pose estimation results include intent estimation, emotion and facial expression recognition and the like.

Further, in order to determine the position of head, a series of computational operations need to be performed. Some of the known computational techniques may include a neural network approach, a probabilistic approach, 3-D model based tracking, machine learning techniques, etc. For instance, the 3D model based tracking system generates or constructs a model every time the subject appears in front of the tracking system or uses the tracking system. This operation of generating models is time consuming and cannot be implemented in applications such as surveillance in public places, shopping malls, etc. In another instance, an image is captured to infer and identify parts of the head (e.g. eyes, nose, hair, ears, cheek, chin, lips, and ears) in machine learning techniques. However, such inferring requires both high scale equipment and computational capability associated with determining of the head position.

SUMMARY

Additional aspects and/or advantages will be set forth in part in the description which follows and, in part, will be apparent from the description, or may be learned by practice of the embodiments described below.

The foregoing and/or other aspects are achieved by providing a computer-implemented method for estimating position of a head in an image. The method includes one or more operations. At a first operation, an image object in an image is cropped. The image object includes visual representation of a head of at least one individual. At a second operation one or more features from the image object is abstracted. Feature is an attribute of an image on which a machine learning system can be applied. At a third operation position of the head of the at least one individual is determined in the image object using the one or more features and a predefined statistical model. The predefined statistical model includes value of each of the pixels of one or more stored images representing variety of head poses and ranges of head poses of the at least one individual. The method further includes operations of calculating probability of each of the pixels in the image object belonging to a set of poses in a predefined statistical model. Thereafter, log likelihood sum for each of set of poses based on the probability values of the pixels in the image object is calculated. Subsequently, one of the set of poses having maximum log likelihood sum is determined as position of the head in the image object.

The foregoing and/or other aspects are achieved by providing an apparatus. The apparatus includes a processor, and a memory. The memory is coupled to the processor. The memory includes a cropping module configured for cropping an image object in an image. The image object includes visual representation of a head of at least one individual. The memory further includes an abstraction module configured for abstracting one or more features from the image object and a head position determining module configured for determining position of the head of at least one individual in an image using one or more features present in the image and a predefined statistical model. The predefined statistical model includes values of each of the pixels of one or more stored images of variety of positions of the at least one individual. The head position determining module is further configured for calculating probability of each of the pixels in the image object belonging to a set of poses in a predefined statistical model. The head position determining module is furthermore configured for computing log likelihood sum for each of set of poses based on the probability values of the pixels in the image object, and determining one of the set of poses having maximum log likelihood sum as position of the head in the image object.

The foregoing and/or other aspects are achieved by providing a non-transitory computer readable storage medium. The non-transitory computer readable storage medium has instructions stored therein, that when executed by a computing device; cause the computing device to perform a method. The method includes one or more operations. At a first operation, an image object in an image is cropped. The image object includes visual representation of a head of at least one individual. At a second operation one or more features from the image object is abstracted. At a third operation position of the head of the at least one individual is determined in the image object using the one or more features and a predefined statistical model. The predefined statistical model includes value of each of the pixels of one or more stored images representing variety of head poses and ranges of head poses of the at least one individual. The method further includes operations of calculating probability of each of the pixels in the image object belonging to a set of poses in a predefined statistical model. Thereafter, log likelihood sum for each of set of poses based on the probability values of the pixels in the image object is calculated. Subsequently, one of the set of poses having maximum log likelihood sum is determined as position of the head in the image object.

The foregoing and/or other aspects are achieved by providing a head position estimating apparatus. The apparatus includes a processor to control one or more processor-executable modules, an abstraction module configured to abstract one or more features of an image object comprising a visual representation of a head of at least one person, and a head position determining module configured to determine a position of the head of the at least one person in the image object using the one or more features abstracted by the abstraction module and a predefined statistical model. The apparatus may also include a cropping module configured to crop the image object in the image, and wherein the abstraction module is further configured to abstract the one or more features from the cropped image object.

BRIEF DESCRIPTION OF THE DRAWINGS

These and/or other aspects and advantages will become apparent and more readily appreciated from the following description of the embodiments, taken in conjunction with the accompanying drawings of which:

FIG. 4 illustrates an output interface for displaying output of head position of the subject, in accordance with an embodiment of the present disclosure.

Figure 1:
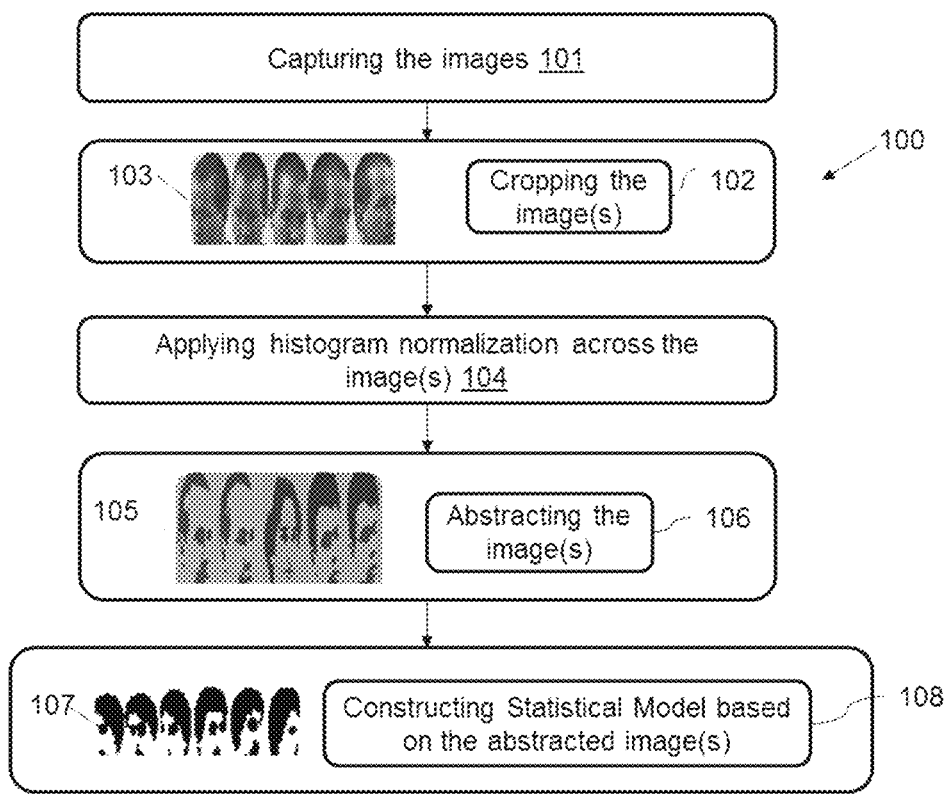
FIG. 1 is a process flowchart illustrating an exemplary method of constructing a statistical model for one or more images of a subject, in accordance with an embodiment of the present disclosure.

The drawings described herein are for illustration purposes only and are not intended to limit the scope of the present disclosure in any way.

DETAILED DESCRIPTION

Reference will now be made in detail to the embodiments, examples of which are illustrated in the accompanying drawings, wherein like reference numerals refer to the like elements throughout. The embodiments are described below to explain the present disclosure by referring to the figures.

One or more embodiments of the present disclosure provide a method and apparatus for estimating a head position in an image. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments. Accordingly, the examples should not be construed as limiting the scope of the embodiments herein.

FIG. 1 is a process flowchart illustrating an exemplary method 100 of constructing a statistical model for one or more images, in accordance with an embodiment of the present disclosure. In an embodiment, the method 100 of construction of statistical model may be a training method implemented by a system. The method operations depicted in the process flowchart 100 may be implemented through a computing device such as a mobile phone, a camera, a notebook computer, an image or multimedia processing device, a tablet computer, a notepad device, a personal computer and the like.

According to the method 100 of the present embodiment, at step 101, one or more images are captured, for example, using a camera or other image capture device. Each image visually represents the head of at least one subject. For example, the images are captured at certain predefined angles such as 15, 30, 45, 60 degrees and exhibiting movements such as pitch, roll and yaw. The term "subject" refers to a person or an individual recorded in the one or more images 103.

At step 102, the one or more images 103 are cropped to suitable requirements. A process of removing an unnecessary or extraneous portion of the images and then resizing and rescaling the images may be referred to as "cropping" the one or more images. At step 102, the one or more images are sized to comply with requirements. In an embodiment of the present disclosure, step 102 may be performed manually to enable learning of the system. In another embodiment of the present disclosure, the step 102 may be performed automatically after capturing the one or more images. For example, the cropping may be performed close to the head of the subject's image to minimize or reduce extraneous image data. At step 104, histogram normalization may be performed across the cropped images 105 (herein after referred to as a cropped image object).

At step 106, abstraction of one or more features from each of the cropped image objects is performed. In an embodiment, the one or more features are abstracted from the cropped image objects by converting the image objects (the head of the subject) to a Non-Photorealistic Rendering (NPR) form. Non-photorealistic rendering is a broad term encompassing various techniques that give an interpretation of an image according to some underlying attributes such as color and edges. In another embodiment of the present disclosure, the one or more features are abstracted from each image object by converting the cropped image objects to abstracted image objects using a color based segmentation technique. The color based segmentation technique may assist in retaining key parts or features of the head such as eyes, ears, nose, hair, ears, cheek, chin and lips and the like. The abstracted image 107, generated at the step 106, may have a lower resolution or size, or both, compared to the cropped image objects.

In an embodiment, a specific method of seed growing is performed for abstracting one or more features from the cropped image objects. The seed growing is followed by one or more refinement steps. In the seed growing method, whenever the threshold value of the pixel is violated or crossed, a new seed is planted and a new region is grown. Thereafter, one or more refinement steps are performed in the image object. The refinement steps may include the smoothing or leveling of boundaries created by segments. For example, if there are three out of four pixels belonging to a particular color segment, then the fourth pixel belonging to a different color segment may be merged with the other three pixels. This may be one of several possible techniques for leveling the image object. Further, a uniform or standard segmentation threshold value of the pixels may be maintained throughout the image object. In another embodiment, a hierarchy-based segmentation technique may be performed instead of the color based segmentation.

At step 108, a statistical model is generated for the objects of the abstracted image 107 using data obtained from the abstracted image 107. For example, data associated with each pixel of the abstracted image 107 may be utilized to create the statistical model. Each pixel of the objects of the abstracted image 107 may contain information regarding color, contrast, and the like. The corresponding information present in each pixel in relation to varying head poses is different. Head Pose refers to a relative position and orientation of the head with respect to the camera. The information of each pixel is introduced in the statistical model corresponding to the varying degrees of the head position. Further, each pixel of the objects of the abstracted image 107 is considered to be statistically independent. In an embodiment, the statistical model used is of a normal distribution type or Gaussian model which is given by the formula:

$$f(x) = \frac{1}{\sqrt{2\pi\sigma^2}} e^{-\frac{(x-\mu)^2}{2\sigma^2}} \quad (1)$$

where, corresponding mean (μ) and standard deviation (σ) are known.

Figure 2:
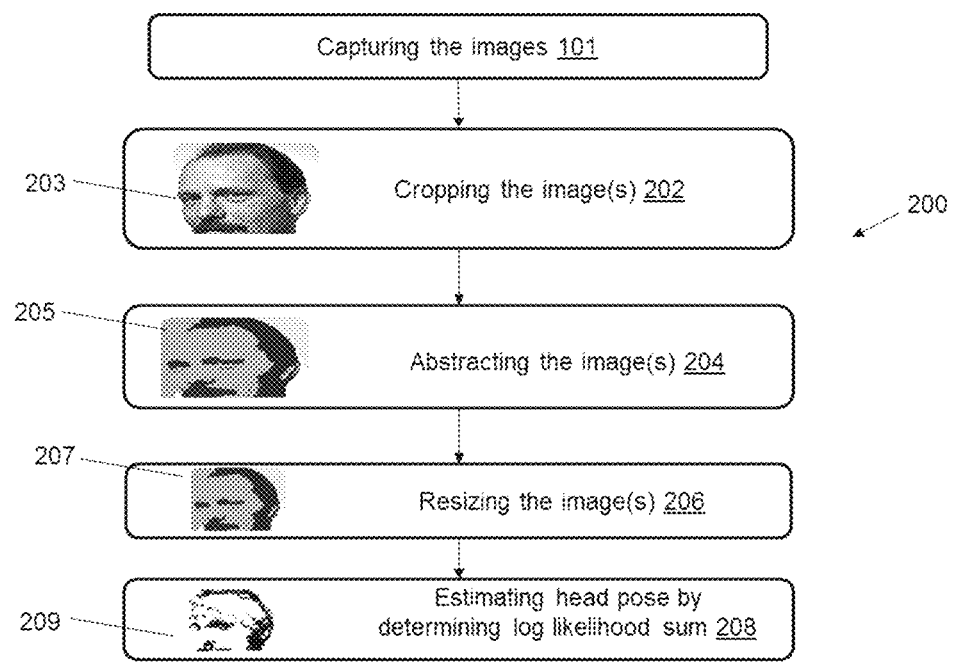
FIG. 2 is a process flowchart illustrating an exemplary method of determining position of a head of a subject in an image, in accordance with an embodiment of the present disclosure.

FIG. 2 is a process flowchart illustrating an exemplary method 200 of estimating a head position of a subject in an image, in accordance with an embodiment of the present disclosure. The method 200 is a computer implemented method in accordance with an embodiment of the present disclosure.

Images of subjects are captured, at step 101. At step 202, images 203 are cropped to the requirement. The cropping of the images 203 may be performed automatically by an algorithm executed by a processor (not shown in the figure). In an embodiment of the present disclosure, the process for cropping the images 203 can be learned from step 102 of FIG. 1. The images 203 are processed to apply abstraction technique such as NPR. At the end of operation 204, an abstracted image 205 is generated. The abstracted image 205 contains essential information with key features such as eyes, nose, hair, ears, cheek, chin and lips, etc. This operation may be performed in order to provide an image which consumes less computational effort to determine the position of head of the subject(s). The operation of abstracting the images 203 has been explained in detail with respect to the operation 108 of FIG. 1.

Further, at operation 206, the abstracted image object 205 is resized and reshaped to suitable requirements. For example, the abstracted image object 205 may be reshaped to square (N×N) resized to (32×32). A resized image object 207 is generated at the end of operation 206. At operation 208, a rough head position of the subject is estimated. Head Pose Estimation refers to computation/tracking of a head pose in an image/video and the estimation of the head pose may include one or more operations. At a first operation, information from each of the pixels from the abstracted image 205 is extracted. The extracted information, for example, a value of a pixel is introduced into a head position determining module (for e.g. as explained in FIG. 1). The probability of each of the pixels in objects of the image 205 belonging to a set of a plurality of sets of poses in a predefined statistical model is calculated. Thereafter, a log likelihood sum for each of the plurality of sets of poses based on the probability values of the pixels in the image object is computed. The operation is subsequently followed by determining one set of the plurality of sets of poses having a maximum log likelihood sum as a position of the head in the image object. The log likelihood sum is calculated for each of the pixels of the abstracted image 205 with stored images for the various head poses. Each of the pixels of the stored images has a value that is used to generate the statistical models. A rough head position of the subject present in the abstracted image 205 based on the determined log likelihood sum is estimated. One of the stored images, which provides a maximum log likelihood sum, may be derived. The stored image with the maximum log likelihood sum provides a head pose range. The estimation of head position may provide a result containing a range of turn angle and a type of movement for e.g. a pan or panning type of head movement, 30° to 45° (turn angle). The formula for arriving at a log likelihood sum may be provided as follows:

$$\sum_i \left( \frac{(x_i - \mu_{ij})}{\sigma_{ij}} \right)^2 \quad (2)$$

In an embodiment, another method of determining head position is provided. For each of the pixels of the abstracted image 205, a value of abstraction is introduced into the statistical model. This introduction is done for all pixels and for all the possible head positions and is fed into the predefined statistical model. Let '$p_{ij}$' denote the probability of pixel 'i' being in head position 'j'. Now the product of probabilities ($p_{ij}$) is found across all pixels 'i' for each pose 'j'. A sum of the product of probabilities is determined. The range of pose 'j' for which the sum of the product is maximum for a majority of the pixels 'i' of the pose 'j' is identified. Thereafter, the pose of the head is determined to be in the range of pose 'j'.

Figure 3:
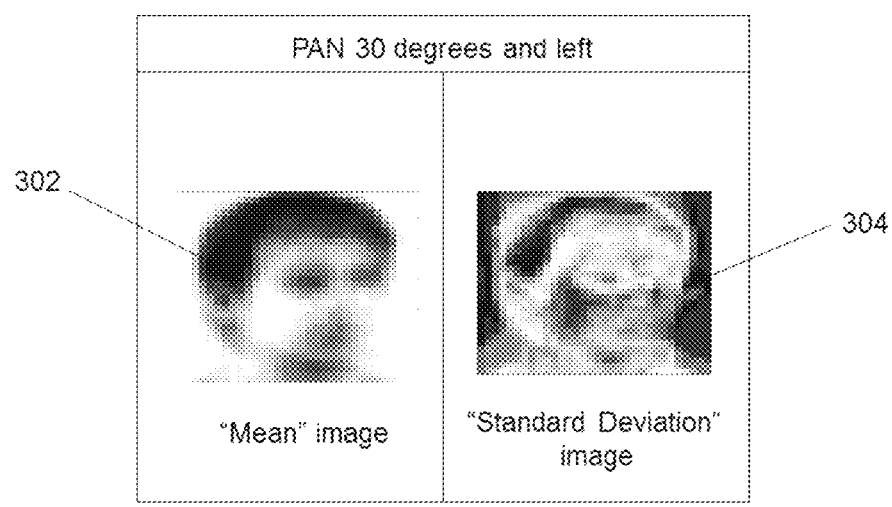
FIG. 3 is a schematic diagram illustrating a mean value based image and a variance value based image for a particular head position of a subject, in accordance with an embodiment of the present disclosure.

FIG. 3 illustrates a learned mean image 302 and a learned standard deviation image 304 for a particular head position of a subject, in accordance with an embodiment of the present disclosure. The learned mean image 302 may show certain important features of subject's head such as eyes, ears, nose, hair, ears, cheek, chin and lips etc. The important features are displayed in uniformly dark patches in the learned mean image 302 and skin is displayed in a light shade. The learned variance image 304 displays certain parts of the head of the subject such as hair, cheek, eyes and mouth with less variance compared to other parts of the head. In the present embodiment, the characteristics of the image (mean and variance) are for a pan movement of the head towards a left and the turn degree is approximately 30°. Similar to the present images (the learned mean image 302 and the learned variance image 304), the images for mean and variance can be obtained for various degrees and movements of the head.

FIG. 4 illustrates an output interface 400 for displaying output of a head position of the subject, in accordance with an embodiment of the present disclosure. The output interface 400 is an exemplary output interface where pose ranges 406 are provided for one or more test images present in test image column 402. The output interface 400 includes three essential columns namely, the test image column 402, an abstracted image column 404 and a pose range column 406. The one or more test images of the subject are listed in the test image column 402. The abstracted images for the corresponding one or more test images are displayed in the abstracted image column 404. The pose range column 406 includes a resultant range of poses in which the position of the head has been determined. The resultant range in the pose range column 406 includes two types of information. The first type includes the type of movement of the head, for example, pan, tilt, yaw, pitch etc. The second type includes the turn degree of the head of the subject such 15°, 30°, 45°, 60° and so on.

Figure 5:
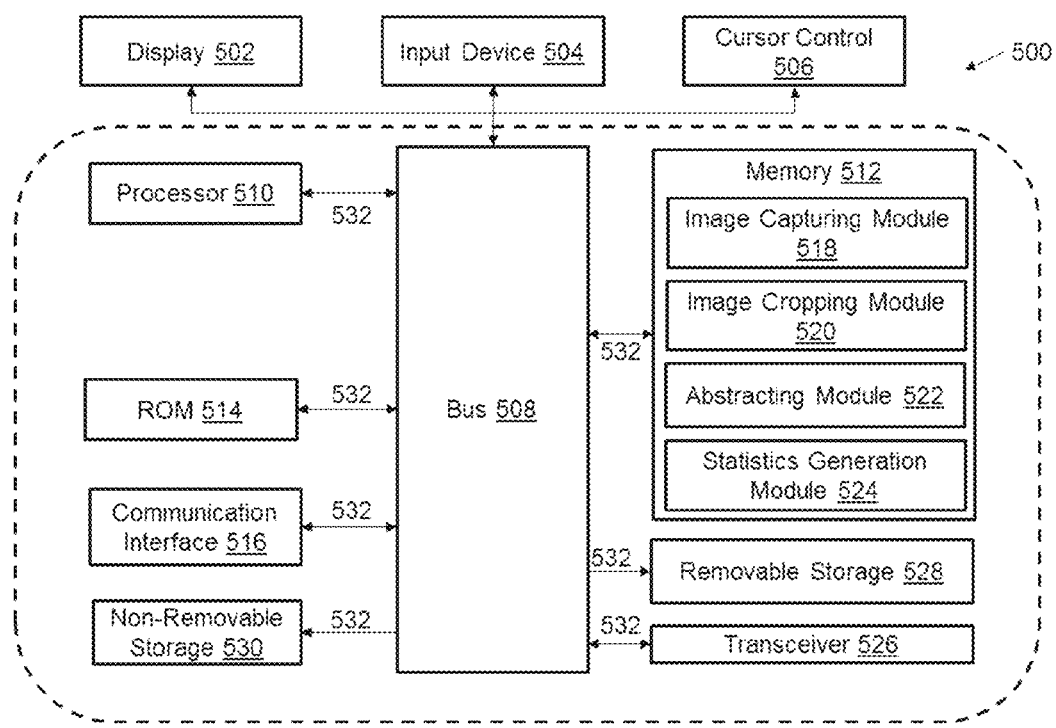
FIG. 5 is a block diagram illustrating a computing apparatus configured for generating a statistical model for one or more images, in accordance with an embodiment of the present disclosure.

FIG. 5 is a block diagram illustrating a computing apparatus 500 used for generating a statistical model for one or more images, in accordance with an embodiment of the present disclosure. The computing apparatus 500 may include, for example, a display 502, an input device 504, a cursor control 506, a bus 508 connecting a memory 512 and a processor 510, a ROM 514, a communication interface 516, a transceiver 526 and network connections 532. The input device 504 may be keyboard, mouse, and the like. The display 502 may be a monitor of the computing apparatus. The network connections 532 may include a wireless communication network such as wireless local area network, local area network and the like. The memory 512 may include an image capturing module 518, an image cropping module 520, an abstracting module 522, and a statistics generation module 514. In an embodiment of the present disclosure, the apparatus 500 may be a device that is capable of processing images.

The memory 512 may include volatile memory or a non-volatile memory, or both. A variety of computer-readable storage media may be stored in and accessed from the memory elements of the computing device 500, the removable storage 528 and the non-removable storage 530. Computer memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

Further, the images that are captured at the image capturing module 518 are transferred to the image cropping module 520. The image cropping module 520 is configured to crop the images that are received. In an embodiment, the process of cropping the images may be done with or without human intervention. The abstracting module 522 that follows the image cropping module 520 is configured to perform operation of abstracting the images. The process of abstracting the images may include performing NPR or any other abstracting process. The statistics generation module 524 is configured to generate a statistical distribution based on the information present in each of the pixels of the abstracted images.

In an embodiment of the present disclosure, the statistical distribution used may be a normal distribution or Bayesian distribution. The statistical distribution may contain information about each of the pixels of the images that are captured over various head positions. For example, one of the head position may be referred to as a pan (movement) and 60° (turn angle). The images that are captured for different types of movements and different degrees of turn angle contain information at a certain pixel level which is incorporated into the statistical distribution data. Functions performed by each of the modules of the apparatus 500 may be learning operations for processing real time images.

The processor 510 is coupled with the memory 512 and is configured to assist in creation of the statistical distribution data. The processor 510, as used herein, may refer to any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 510 may also include embedded controllers, such as generic or programmable logic devices or arrays, application specific integrated circuits, single-chip computers, smart cards, and the like.

Embodiments of the present subject matter may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 510 of the computing apparatus 500.

Figure 6:
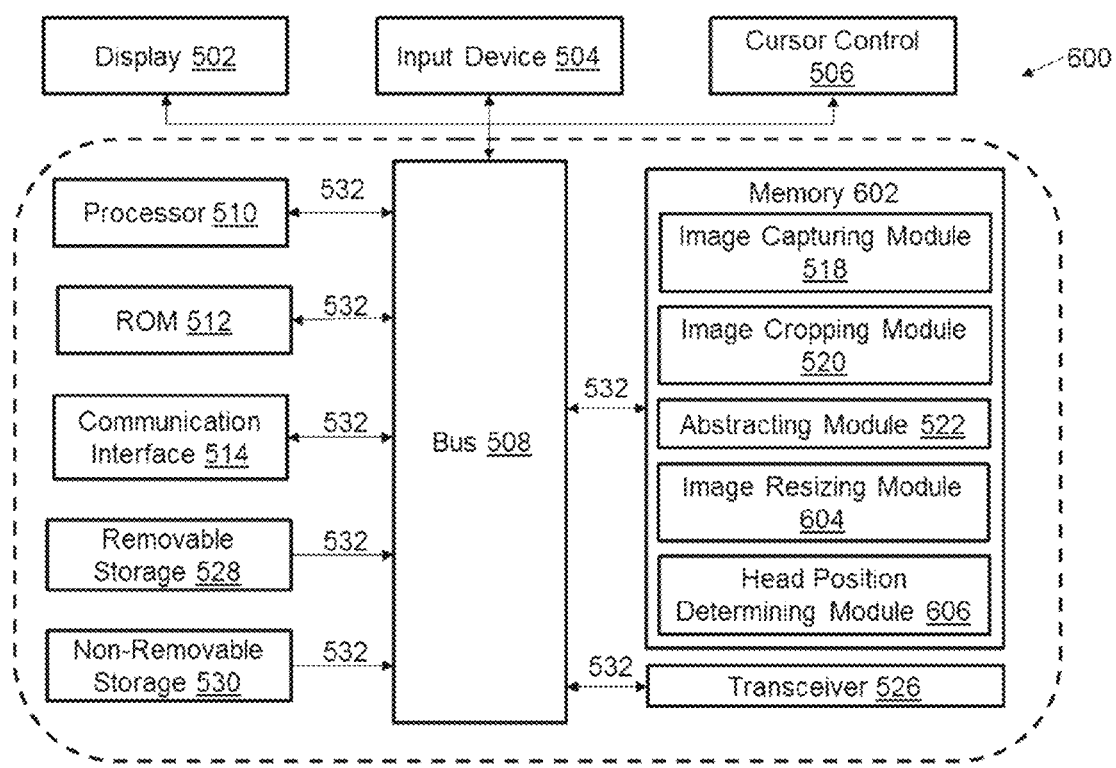
FIG. 6 is a block diagram illustrating a computing apparatus configured for determining position of head of the subject, in accordance with an embodiment of the present disclosure.

FIG. 6 illustrates a computing apparatus 600 for determining head position of the subject, in accordance with an embodiment of the present disclosure. The computing apparatus 600 may include most of the elements/components and parts in common with apparatus 500, except for memory 602, which in an embodiment is different than memory 512. Memory 602 includes, for example, an image resizing module 604 and head position determining module 606.

When the image of the subject is captured at the image capturing module 518, the image contains more information than is required to determine the position of head. In other words, regions other than the head of the subject may be present in the image. These regions may be cropped from the image and removed using the image cropping module 518. On receiving the cropped image, the abstracting module 522 is configured to perform image abstraction. The abstraction operation performed by the abstracting module 522 retains key features or essential information about the head of the subject and removes non-essential information. As a result, the abstraction module 522 may create an image with less information or detail compared to the cropped image.

Further, the abstracted image may be transferred to the image resizing module 604. The image may then be sized to the requirement. Thereafter, the image may be fed to the head position determining module 606. The head position determining module 606 is configured for determining a position of the head of at least one individual in an image using one or more features present in the image and a predefined statistical model. The head position determining module 606, on receiving the abstracted image, may be configured to perform one or more operations. At a first operation, a probability of each of the pixels in the image object belonging to a set of a plurality of sets of poses in a predefined statistical model is calculated. At a second operation, a log likelihood sum for each of the plurality of sets of poses based on the probability values of the pixels in the image object is calculated and thereafter one of the set of poses having a maximum log likelihood sum, of the plurality of sets of poses, may be determined as the position of the head in the image object.

The embodiments disclosed herein can be implemented through at least one software program running on at least one hardware device. The elements shown in the figures can be at least one of a hardware device, or a combination of a hardware device and a software module. Any one or more of the software modules described and illustrated herein may be executed by a controller such as a dedicated processor unique to that unit or by a processor common to one or more of the modules. The described methods may be executed on a general purpose computer or processor or may be executed on a particular machine such as the apparatus described herein.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A computer-implemented head position estimating method comprising:
cropping an image object in an image, wherein the image object comprises a visual representation of a head of at least one individual;
abstracting one or more features from the image object; and
determining a position of the head of the at least one individual in the image object, by way of a processor, using the one or more abstracted features and a predefined statistical model, wherein the determining the position of the head comprises calculating a probability that each of the pixels in the image object belongs to a set of poses of a plurality of sets of poses in the predefined statistical model, and determining the position of the head based on the calculated probability.

2. The computer-implemented method as recited in claim 1, wherein the predefined statistical model comprises a value of each of the pixels of one or more stored images that represent a variety of head poses and ranges of head poses of the at least one individual.

3. The computer-implemented method as recited in claim 1, wherein the determining the position of the head further comprises:
computing a log likelihood sum for each of the plurality of sets of poses based on the probability values of the pixels in the image object; and
determining one set of the plurality of sets of poses having a maximum log likelihood sum as the position of the head in the image object.

4. The computer-implemented method as recited in claim 1, wherein the one or more features comprises at least one of eyes, nose, hair, ears, cheek, chin and lips.

5. The computer-implemented method as recited in claim 1, further comprising capturing an image which visually represents the head of the at least one individual.

6. The computer-implemented method as recited in claim 1, further comprising resizing the image object to a predefined size upon the abstracting of the one or more features from the image object.

7. The computer-implemented method as recited in claim 1, wherein the abstracting the one or more features from the image object is performed using a non-photorealistic rendering technique.

8. The computer-implemented method as recited in claim 1, wherein the abstracting the one or more features from the image object comprises:
identifying a color of each of the pixels in the image object; and
segmenting pixels of the image object into groups of similar colors for identifying the one or more features.

9. An apparatus comprising:
a processor configured to control one or more processor-executable modules;
a cropping module among the one or more processor-executable modules, the cropping module being configured for cropping an image object in an image, wherein the image object comprises a visual representation of a head of at least one individual;
an abstraction module among the one or more processor-executable modules, the abstraction module being configured for abstracting one or more features from the image object; and
a head position determining module among the one or more processor-executable modules, the head positioning determining module being configured for determining a position of the head of the at least one individual in the image object using the one or more features abstracted by the abstraction module and a predefined statistical model, wherein the determining the position of the head comprises calculating a probability that each of the pixels in the image object belongs to a set of poses of a plurality of sets of poses in the predetermined statistical model, and determining the position of the head based on the calculated probability.

10. The apparatus of claim 9, wherein the predefined statistical model comprises a value of each of the pixels of one or more stored images of a variety of positions of the at least one individual.

11. The apparatus as recited in claim 9, wherein the determining the position of the head further comprises:
computing a log likelihood sum for each of the plurality of sets of poses based on the probability values of the pixels in the image object; and
determining one set of the plurality of sets of poses having a maximum log likelihood sum as position of the head in the image object.

12. The apparatus as recited in claim 11, wherein in the abstracting the one or more features from the image object, the abstraction module is configured for:
identifying a color of each of the pixels in the image object; and
segmenting pixels in the image object into groups, wherein each of the groups of pixels belong to a specific color.

13. A non-transitory computer readable storage medium having instructions stored therein, that when executed by a computing device, cause the computing to perform a method, the method comprising:
cropping an image object in an image, wherein the image object comprises a visual representation of a head of at least one individual;
abstracting one or more features from the image object; and
determining a position of the head of the at least one individual in the image object using the one or more abstracted features and a predefined statistical model, wherein the determining the position of the head comprises calculating a probability that each of the pixels in the image object belongs to a set of poses of a plurality of sets of poses in the predetermined statistical model, and determining the position of the head based on the calculated probability.

14. The storage medium according to claim 13, wherein the predefined statistical model comprises a value of each of the pixels of one or more stored images that represent a variety of head poses and ranges of head poses of the at least one individual.

15. The storage medium according to claim 13, wherein the determining the position of the head further comprises:
computing a log likelihood sum for each of the plurality of sets of poses based on the probability values of the pixels in the image object; and
determining one set of the plurality of sets of poses having a maximum log likelihood sum as position of the head in the image object.

16. The storage medium according to claim 13, wherein the one or more features comprises at least one of eyes, nose, hair, ears, cheek, chin and lips.

17. The storage medium according to claim 13, the method further comprising capturing an image which visually represents the head of the at least one individual.

18. The storage medium according to claim 13, the method further comprising resizing the image object to a pre-defined size upon the abstracting of the one or more features from the image object.

19. The storage medium according to claim 13, wherein the abstracting the one or more features from the image object is performed using a non-photorealistic rendering technique.

20. The storage medium according to claim 13, wherein abstracting the one or more features from the image object comprises:
   identifying color of each of the pixels in the image object; and
   segmenting pixels of the image object into groups of similar colors for identifying the one or more features.

21. A head position estimating apparatus comprising:
   a processor configured to control one or more processor-executable modules;
   an abstraction module among the one or more processor-executable modules, the abstraction module being configured to abstract one or more features of an image object comprising a visual representation of a head of at least one person; and
   a head position determining module among the one or more processor-executable modules, the head position determining module being configured to determine a position of the head of the at least one person in the image object using the one or more features abstracted by the abstraction module and a predefined statistical model, wherein the determining the position of the head comprises calculating a probability that each of the pixels in the image object belongs to a set of poses of a plurality of sets of poses in the predefined statistical model, and determining the position of the head based on the calculated probability.

22. The head position estimating apparatus as recited in claim 21, further comprising a cropping module configured to crop the image object in the image, and wherein the abstraction module is further configured to abstract the one or more features from the cropped image object.

* * * * *